United States Patent [19]

Bialek

[11] 4,302,326
[45] Nov. 24, 1981

[54] TAR SANDS EMULSION-BREAKING PROCESS

[75] Inventor: Rene F. Bialek, Calgary, Canada

[73] Assignee: Texaco Canada Inc., Calgary, Canada

[21] Appl. No.: 133,167

[22] Filed: Mar. 24, 1980

[51] Int. Cl.³ ............................................. C10G 33/04
[52] U.S. Cl. .................................. 208/188; 252/331; 166/267
[58] Field of Search .................. 208/188; 252/331; 166/267

[56] References Cited

U.S. PATENT DOCUMENTS

| | | | |
|---|---|---|---|
| 2,504,019 | 4/1950 | Hall | 252/329 |
| 2,964,478 | 12/1960 | Monson | 208/188 |
| 3,607,721 | 9/1977 | Nagy | 208/188 |
| 3,684,699 | 8/1972 | Vermeulen | 208/188 |
| 4,058,453 | 11/1977 | Patel | 208/188 |

FOREIGN PATENT DOCUMENTS

| | | | |
|---|---|---|---|
| 2830637 | 4/1979 | Fed. Rep. of Germany | 208/188 |
| 647336 | 2/1979 | U.S.S.R. | 208/188 |

Primary Examiner—Brian E. Hearn
Attorney, Agent, or Firm—Carl G. Ries; Robert A. Kulason; Henry W. Archer

[57] ABSTRACT

Disclosed is a process for breaking an oil-in-water emulsion, in particular a raw emulsion produced in in situ tar sand plants, by first contacting with a polyethylene polymeric resin having a molecular weight in the range of 100,000 and 7,000,000 the raw emulsions; allowing to stand for two to four hours; adding a hydrocarbon diluent, optionally containing a larger amount of resin and then removing a mixture of diluent and oil floating on the water surface.

10 Claims, 1 Drawing Figure

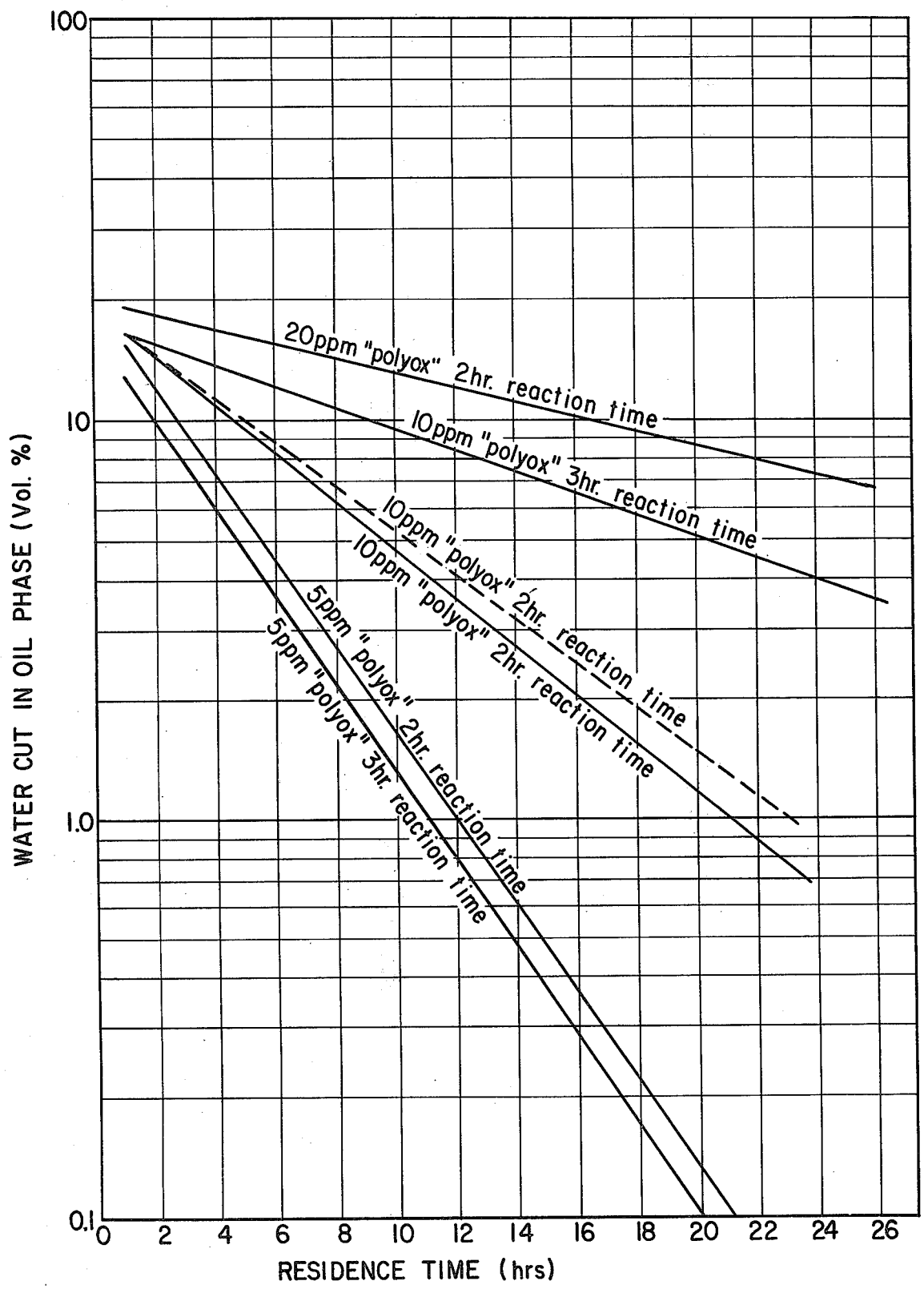

TAR SANDS EMULSION-BREAKING PROCESS

BACKGROUND OF THE INVENTION

1. Field of the Invention

This invention is concerned with the resolution of water-bituminous emulsions stabilized with clay by treatment with resins. The invention is also concerned with the separation of water from bitumen which has been brought to the surface in the form of oil-in-water emulsions by an in-situ recovery process.

2. Prior Disclosures

Numerous hot water extraction methods exist for separating crude oil from bituminous sands (tar sands, oil sands and the like) which involve mixing such sands with hot or cold water and separating the sand from the resulting emulsions.

The technical difficulty encountered with emulsions produced by in-situ operations is that the liquid mixture is a highly stabilized emulsion which is difficult to break with standard treating chemicals.

Previous attempts to break emulsions resulting from hot water extraction processes are illustrated, inter alia, by the techniques described in U.S. Pat. Nos. 3,607,721, and 3,487,003.

Thus, U.S. Pat. No. 3,808,120 describes a method for separating at least water and solids from the froth produced in a hot water process of separating bitumen from tar sands by treating the froth in at least one cyclone zone, after which it is treated in at least two centrifuging zones.

In U.S. Pat. No. 3,606,721 a process for the removal of solids and emulsified water from the bituminous emulsion is disclosed which comprises diluting the emulsion with a hydrocarbon diluent; maintaining the resulting mixture in a settling zone; removing the emulsion when substantially free of solids and emulsified water from the top of the settline zone; withdrawing settled sludge from the bottom of the settling zone and centrifuging the withdrawn sludge to separate bitumen and diluent from the settled solids and the emulsified water.

U.S. Pat. No. 3,487,003 describes a method for reducing the solids content of an effluent dicharge from a hot water process for separating oil from bituminous sands by adding a flocculating agent which may be organic, inorganic or even a polyalkylene oxide of undisclosed molecular weight to this effluent; adjusting the pH of the effluent to less than 7.5 or more than 9 to effect flocculation of at least a portion of the solids therein; centrifuging the effluent now containing flocculated solids and recovering the effluent discharge substantially reduced in solids content. This method treats not an oil-in-water emulsion but rather an effluent comprised of the effluent from the sand tailing layer and the middlings layer. Further, there is no appreciation therein of the necessity for maintaining the temperature within a given range during treatment with the flocculating agent.

U.S. Pat. No. 2,964,478 describes a process for breaking an oil-in-water emulsion by subjecting the emulsion to the sole action of a polyalkylene oxide having a molecular weight of 100,000 to 3 million. In the practice of that process the mixture of the resin is allowed to stand quiescent for about 19 hours at a settling temperature ranging from room temperature to 160° F., after which some of the oil rises to the surface of the pond or sump and is removed.

In U.S. Pat. No. 4,058,453, to Patel et al, there is disclosed a process for recovering oil from oil-in-water and water-in-oil emulsions by demulsifying the emulsions by adding thereto effective amounts of on-ionic, water-soluble, polyethylene oxide polymers having a molecular weight in the range of 100,000 to 7,000,000, called "Polyox" and calcium chloride and separating the oil from the water. Optionally, in that process, the emulsions are diluted, following addition to the polymer, with from 30 to 50 volume percent of a hydrocarbon diluent and, after maintaining the temperature of the resulting mixture at between 150° and 210° F., the oil therein is centrifuged from the solids and the water.

SUMMARY OF THE INVENTION

The main object of this invention is to achieve functional demulsification of emulsions at a minimal cost and in a minimum amount of time.

This object is attained by the present invention which resides in the concept of demulsifying emulsions stabilized by clays, both naturally occurring and those formed in situ, by adding from 3 to about 5 parts per million by weight basis volume of said emulsions of an ethylene oxide polymer having a molecular weight in the range of 100,000 to 7,000,000. Particularly, suitable polymers are those marketed under the trademarked name "Polyox." These are high polymers defined by the general formula $(-O-CH_2-CH_2)_n$ with the degree of polymerization "n" ranging from about 200 to about 100,000 so as to give the above indicated molecular weight. From 30 to 50 volume percent of a diluent in which the bitumen is soluble, such as toluene, diesel oil, fuel oil, kerosene and the like are added and mixed with the bitumen-water emulsion for 2 to 4 hours after adding the "Polyox" resin.

In a preferred modification of the invention an additional 5 to 10 ppm of "Polyox" are added with the diluent.

After the diluent and the resin are added to the emulsion, the entire mixture is flowed to an atmospheric treating tank. In this tank, the diluted bitumen separates by gravity from the water and is skimmed off. Steam distillation preferably is used to separate diluent from the bitumen. Preferably the pH of the emulsion is 7 to 8.

BRIEF DESCRIPTION OF THE DRAWING

The present invention will be more readily understood as the description thereof proceeds particularly when taken together with the accompanying drawing whose single FIGURE is a graph giving a comparison between the volume percent of the water cut in an oil phase with the residence times for several treating conditions.

As background, it should be noted that based on the data collected and field treating results, the following treating mechanism can be postulated:

Step 1: the clays must enter the water phase without the emulsion inverting.

Step 2: the emulsion must break and the bitumen must be diluted.

Step 3: the bitumen must coalesce and separate.

Unexpectedly, while many chemicals will force the clays into the water phase, and produce a tight inverted emulsion, "Polyox" has the unique property of both placing the clays into the water phase and also coalescing the diluted bitumen. With "Polyox", the initial step is very slow and is virtually independent of "Polyox" concentration. Concentrations of 3 ppm to 5 ppm appear adequate and additional "Polyox" has no effect. Steps 2 and 3, on the other hand, are very dependent on "Polyox" concentration and are relatively rapid. The higher the concentration the faster the reaction; 8 ppm to 10 ppm appear to be the minimum concentration for Steps 2 and 3.

Unexpectedly, simultaneously treating with 10 ppm to 15 ppm "Polyox" and diluent creates a unique situation. Steps 2 and 3, being fast, overtake Step 1, clay/water is coalesced with the oil, and bad water cuts result. Lower "Polyox" concentrations aid in the clay problem, but insufficient "Polyox" is then present for coalescing. Attempts to treat in the field in the 25 ppm to 50 ppm range have resulted in inverted emulsions and uncoalesced oil.

Experimental field data is consistent with the above mechanism. In practice, in the battery, "Polyox" and diluent are added and mixed simultaneously prior to entering a 5,000 barrel tank. However, the diluent simply passes through because "Polyox" must first place the clays into the water phase and partially break the emulsion before the diluent can mix. The diluent, since it enters the bottom of the tank through a downcomer, reacts with "Polyox" treated emulsion as it rises up to the top. In other words, the diluent does not work simultaneously with "Polyox" in the mixer but works on the emulsion which "Polyox" has reacted with for 2 to 4 hours. This explains why a heavy undiluted layer of bitumen forms and remains stationary in the treating vessel. Treating occurs only because diluent rises through this layer and dilutes the bitumen.

This is also confirmed in the laboratory when both "Polyox" and diluent are added and mixed simultaneously. In all cases the result is diluent floating to the top. But when these samples are remixed, good separation results.

In the laboratory, all bottle tests were run on hot raw emulsion. In all cases, when both "Polyox" and diluent were added and mixed simultaneously, the diluent floated to the top immediately. But when these samples were remixed, good oil/water separation resulted. Next, a series of tests were performed with 5, 10 and 20 ppm "Polyox" mixed with raw emulsion, without diluent, and the mixture allowed to react for a given time (reaction time) prior to the addition of diluent which established the beginning of residence time.

FIG. 1 summarizes all the above laboratory data. As shown, the 5 ppm sample had initially less clay/water in the oil phase, after 24 hours exhibited clean oil, but had uncoalesced oil visible at the interface. Also, the greater the reaction time, the lower the water cut in the oil phase. The 10 ppm sample had a higher clay/water content in the oil phase, but a good sharp interface. Also, the longer the reaction time the higher the initial and final clay/water concentration in the oil phase. The 20 ppm sample had still a higher initial and final clay/water content in the oil phase, but the sharpest interface. All the 5, 10 and 20 ppm samples appeared to contain a trace of oil in the water phase, but the amount of oil decreased with increasing "Polyox" concentration. The note referred to in FIGURE refers to field treating upsets encountered with emulsions such as abnormally higher clay content.

What is claimed is:

1. A process for recovering oil from a oil-in-water emulsion stabilized by clay and other solids comprising intimately contacting said emulsion with an effective demulsifying amount of a non-ionic, water soluble polyethylene oxide polymeric resin having a molecular weight in the range of 100,000 to 7,000,000; allowing the emulsion to settle for 2 to 4 hours; thereafter diluting said emulsion with an effective oil-dissolving amount of a hydrocarbon diluent in which said oil is soluble, thereby obtaining a mixture of said oil, and said diluent floating on said water.

2. The process of claim 1, wherein said effective amount of said resin ranges from 3 to 5 parts per million basis volume of said emulsion.

3. The process of claim 1 wherein from 5 to 10 parts per million of said resin are added with said diluent.

4. The process of claim 1, further including the step of removing said oil and diluent from said water.

5. The process of claim 4, further including the step of recovering said oil from said diluent by steam distillation.

6. The process of claim 1, wherein said emulsion, said resin and said diluent are maintained in contact at a temperature in the range of about 200° to about 240° F.

7. The process of claim 1, wherein said emulsion is a production fluid produced by an in-situ recovery operation.

8. The process of claim 1, wherein 5 to 15 parts per million of resin are added on the basis of the volume of emulsion.

9. The process according to claim 1, wherein said emulsion are at a pH of about 7.0 to about 8.0.

10. The process of claim 1, wherein said diluent is mixed with said emulsion for 2 to 4 hours after adding said resin.

* * * * *